(12) United States Patent
Bender et al.

(10) Patent No.: US 10,793,186 B2
(45) Date of Patent: Oct. 6, 2020

(54) STEERING ASSISTANCE BASED ON DRIVER ANALYTICS AND BEHAVIOR

(71) Applicant: INTERNATIONAL BUSINESS MACHINES CORPORATION, Armonk, NY (US)

(72) Inventors: Michael Bender, Rye Brook, NY (US); John E. Moore, Jr., Pflugerville, TX (US); Gregory J. Boss, Saginaw, MI (US); Stephen McConnell, Northern Ireland (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 15/867,906

(22) Filed: Jan. 11, 2018

(65) Prior Publication Data

US 2019/0210642 A1  Jul. 11, 2019

(51) Int. Cl.
*B62D 6/00* (2006.01)
*B60W 30/00* (2006.01)
(Continued)

(52) U.S. Cl.
CPC ............. *B62D 6/002* (2013.01); *B60W 30/00* (2013.01); *B62D 15/025* (2013.01);
(Continued)

(58) Field of Classification Search
CPC . B60R 25/25; B60R 11/0264; B60R 16/0232; B60R 16/023; B60W 10/20; B60W 40/09; B60W 50/0098; B60W 30/12; B60W 50/14; B60W 50/00; B60W 30/08; B60W 30/16; B60W 50/12; B60W 40/08; B60W 40/1005; B60W 50/10; B60W 30/00; G06K 9/00805; G06K 9/00; G06K 9/00798; G06K 9/6267; G06K 9/00845; G06K 9/00906; G06K 9/00536;
(Continued)

(56) References Cited

U.S. PATENT DOCUMENTS 2,884,258 A   4/1959  Brueder
3,537,531 A  11/1970  Fischer et al.
(Continued)

FOREIGN PATENT DOCUMENTS

WO   2009053081    4/2009

OTHER PUBLICATIONS

Mell et al., "The NIST Definition of Cloud Computing", NIST, Special Publication 800-145, Sep. 2011, 7 pages.

*Primary Examiner* — Behrang Badii
(74) *Attorney, Agent, or Firm* — Jay Wahlquist; Andrew D. Wright; Roberts Calderon Safran & Cole, P.C.

(57) ABSTRACT

A computer-implemented method includes: receiving, by a computing device, data identifying steering adjustments made by a driver; determining, by the computing device, an intent of the driver when making the steering adjustments; generating, by the computing device, steering assist instructions based on determining that the intent of the driver is to maintain the vehicle's position within a driving lane; and outputting, by the computing device, the steering assist instructions to counteract the steering adjustments made by the driver and maintain the vehicle's position within the driving lane.

17 Claims, 9 Drawing Sheets

(51) Int. Cl.

| | |
|---|---|
| *B62D 15/02* | (2006.01) |
| *B60W 50/12* | (2012.01) |
| *B60W 10/20* | (2006.01) |
| *B60W 30/08* | (2012.01) |
| *B60T 8/1755* | (2006.01) |
| *B60W 40/09* | (2012.01) |
| *B60W 30/12* | (2020.01) |
| *G07C 9/37* | (2020.01) |
| *G06K 9/62* | (2006.01) |
| *B60T 8/17* | (2006.01) |
| *G01S 19/50* | (2010.01) |

(52) U.S. Cl.
CPC ......... *B60T 8/1708* (2013.01); *B60T 8/17557* (2013.01); *B60W 10/20* (2013.01); *B60W 30/08* (2013.01); *B60W 30/12* (2013.01); *B60W 40/09* (2013.01); *B60W 50/12* (2013.01); *B60Y 2300/12* (2013.01); *B62D 6/008* (2013.01); *G01S 19/50* (2013.01); *G06K 9/6267* (2013.01); *G07C 9/37* (2020.01)

(58) Field of Classification Search
CPC ............ G06K 9/00892; B62D 15/0255; B62D 6/002; B62D 15/025; B62D 15/029; B62D 6/10; B62D 6/003; B62D 15/021; B62D 6/008; G06F 19/00; G06F 3/0227; G06F 17/00; G06F 3/017; G07C 9/00; G07C 5/0808; G07C 9/37; G07C 5/02; G07C 5/08; G01S 19/50; G01S 13/931; G05D 1/02; G05D 1/0212; G05D 1/0088; G08G 1/167; G08G 1/166; G01P 3/64; G16H 50/20; B60K 28/02; B60K 35/00; B60K 2/066; B60Y 2300/12; B60Q 9/00; B60Q 9/008; G08B 21/06; H04M 1/6083; H04M 1/72577; H04M 1/6091
See application file for complete search history.

(56) References Cited

U.S. PATENT DOCUMENTS

| | | | |
|---|---|---|---|
| 6,389,347 | B1 | 5/2002 | Nozaki |
| 8,948,954 | B1 | 2/2015 | Ferguson et al. |
| 2004/0209594 | A1* | 10/2004 | Naboulsi ................ B60Q 9/00 455/404.1 |
| 2010/0131148 | A1* | 5/2010 | Camhi ................ B60W 40/09 701/31.4 |
| 2010/0274435 | A1* | 10/2010 | Kondoh ................ B60W 40/09 701/31.4 |
| 2012/0053793 | A1 | 3/2012 | Sala et al. |
| 2012/0083960 | A1* | 4/2012 | Zhu ............................ B60R 1/00 701/23 |
| 2012/0109465 | A1* | 5/2012 | Svensson .............. B60W 10/20 701/42 |
| 2013/0274985 | A1* | 10/2013 | Lee ...................... B62D 15/025 701/23 |
| 2016/0001781 | A1* | 1/2016 | Fung ...................... G16H 50/20 701/36 |
| 2017/0101093 | A1* | 4/2017 | Barfield, Jr. ...... G08G 1/096775 |
| 2017/0305349 | A1* | 10/2017 | Naboulsi ................ B60R 1/025 |
| 2017/0341658 | A1* | 11/2017 | Fung ........................ G07C 9/37 |
| 2017/0369073 | A1* | 12/2017 | Huber ................... B60W 30/08 |
| 2018/0086341 | A1* | 3/2018 | Taniguchi ............... B62D 6/008 |

\* cited by examiner

US 10,793,186 B2

STEERING ASSISTANCE BASED ON DRIVER ANALYTICS AND BEHAVIOR

BACKGROUND

The present invention generally relates to steering assistance in a vehicle and, more particularly, to steering assistance in a vehicle based on driver analytics and behavior.

Drivers of vehicles often make minor steering adjustments when driving (e.g., to keep the vehicle on a straight path or on a path within a driving lane). Excessive adjustments can make the ride in a vehicle uncomfortable and potentially unsafe if the adjustments cause the vehicle to veer into an adjacent lane.

SUMMARY

In an aspect of the invention, a computer-implemented method includes: receiving, by a computing device, data identifying steering adjustments made by a driver; determining, by the computing device, an intent of the driver when making the steering adjustments; generating, by the computing device, steering assist instructions based on determining that the intent of the driver is to maintain the vehicle's position within a driving lane; and outputting, by the computing device, the steering assist instructions to counteract the steering adjustments made by the driver and maintain the vehicle's position within the driving lane.

In an aspect of the invention, there is a computer program product for providing steering assistance for a vehicle. The computer program product includes a computer readable storage medium having program instructions embodied therewith, the program instructions executable by a computing device to cause the computing device to: generate a driver profile that identifies different steering adjustments made by a driver to keep the vehicle's positioned maintained within a driving lane under different sets of driving conditions, wherein the steering adjustments include over-adjustments that cause the vehicle to veer out of a center position within the driving lane; receive data identifying real-time steering adjustments made by a driver; determine that an intent of the driver is to maintain the vehicle's position within the driving lane; generate steering assist instructions based on determining that the intent of the driver is to maintain the vehicle's position within the driving lane; and output the steering instructions to cause the vehicle's steering system to counteract the over-adjustments to the steering adjustments made by the driver and maintain the vehicle's position within the driving lane.

In an aspect of the invention, a system includes: a CPU, a computer readable memory and a computer readable storage medium associated with a computing device; program instructions to receive real-time steering adjustment data for a vehicle driven by a driver; program instructions to determine a trajectory of the vehicle based on the real-time steering adjustments and based on a driver profile indicating the driver's historical steering adjustment data; program instructions to determine that the trajectory of the vehicle is outside of a center position within the driving lane; program instructions to generate steering assist instructions based on the determining that the trajectory of the vehicle is outside of the optimal position; and program instructions to output the steering instructions to cause the vehicle's steering system to counteract the real-time steering adjustments and maintain the vehicle's position within the driving lane. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
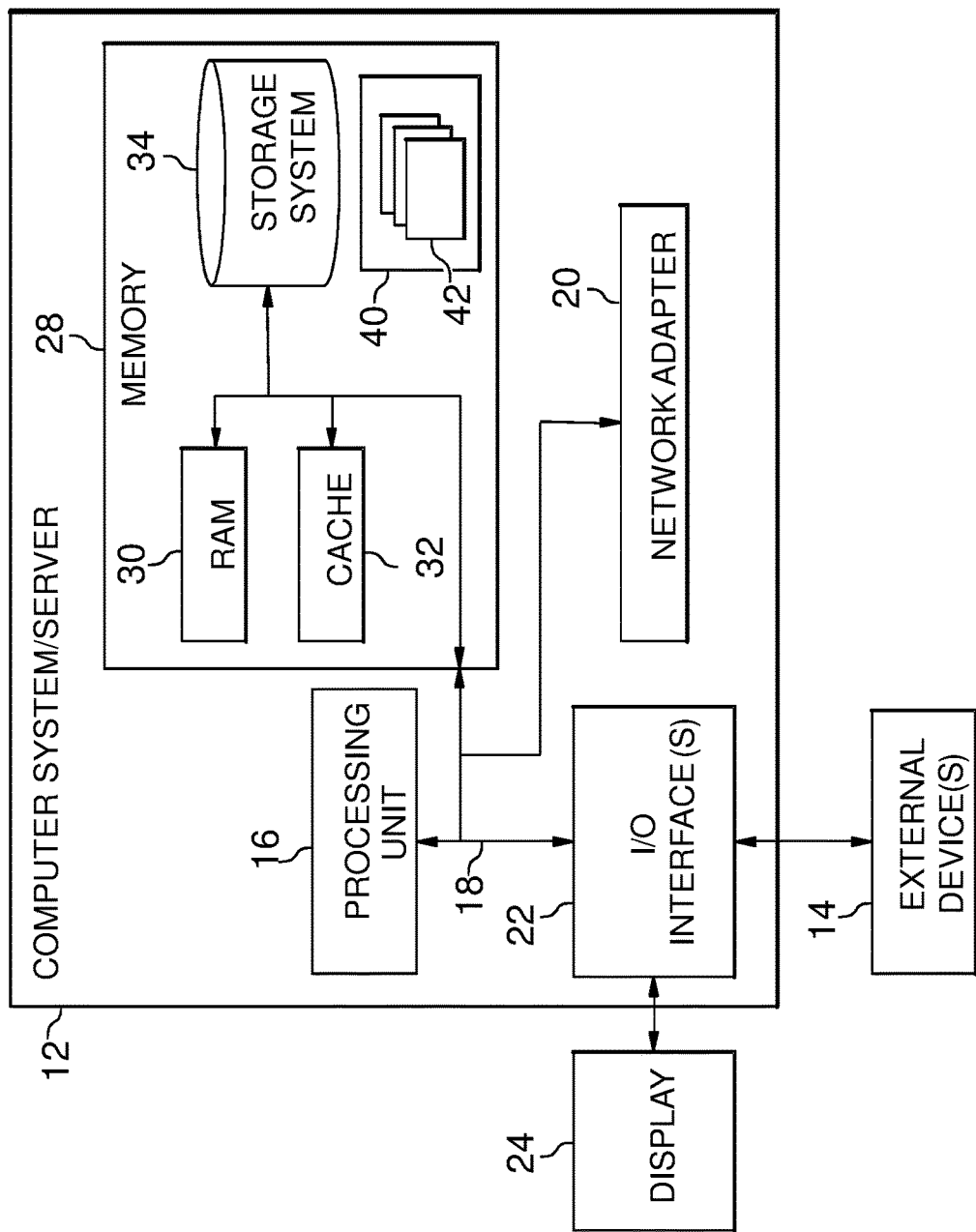
FIG. 1 depicts a cloud computing node according to an embodiment of the present invention.

The present invention generally relates to steering assistance in a vehicle and, more particularly, to steering assistance in a vehicle based on driver analytics and behavior. Aspects of the present invention may analyze a driver's micro-adjustments to steering made while the driver is driving a vehicle, and may assist or adjust the driver's steering to maintain the vehicle in a driving lane. Aspects of the present invention may analyze a driver's patterns and driving style, and develop, over a period of time, a driver profile that indicates micro-adjustments made by the driver to maintain a vehicle in a driving lane. Aspects of the present invention may modify the operations of a steering system to prevent over adjustments from causing the vehicle to veer outside an optimal position (e.g., veer out of the driving lane or cause an erratic and/or unsteady ride). In embodiments, aspects of the present invention may take into account variables for assisting the steering of a vehicle. For example, aspects of the present invention may consider variables such as the driver's profile, current road conditions, current driving and road conditions, vehicle analytics (e.g., turn signal status, vehicle maintenance and wheel alignment status, navigation directions, etc.), environmental conditions, the degree of a steer/turn, the presence of surrounding vehicles, and/or other factors when providing steering assistance.

As described herein, aspects of the present invention may determine the driver's intentions when steering the vehicle based on the aforementioned variables. For example, aspects of the present invention may determine whether the driver is intentionally steering the vehicle to change lanes or make a turn, or if the driver is making micro-adjustments to the steering to maintain the vehicle's position in a driving lane. If steering of the vehicle is intentional, aspects of the present invention may refrain from adjusting the steering so that the intended operation of turning the vehicle or changing lanes occurs seamlessly to the driver. If the steering of the vehicle includes micro-adjustments to maintain the vehicle within a driving lane, aspects of the present invention may provide steering assistance such that the driver's micro-adjustments do not cause the vehicle to veer out of an optimal position (e.g., a driving lane) or cause an excessively erratic or unsteady ride.

As an illustrative, non-limiting example, aspects of the present invention may determine that a driver is intending to change lanes based on a turn signal being active, the degree of the turn exceeding a threshold, no vehicles being present in an adjacent lane, and/or navigation directions indicating that the driver will need to change lanes or make a turn. Accordingly, steering assistance would not be provided such that the driver's turn or lane change is executed uninhibited. As another example, aspects of the present invention may determine that a driver is intending to maintain the vehicle's position in a lane when the degree of the steering is relatively small, when another vehicle is within a threshold distance of the driver's vehicle in an adjacent lane, when a turn signal is not active, and/or when navigation directions indicate that a lane change or turn is not necessary. Accordingly, steering assistance would be provided such that the vehicle's position is maintained within the driving lane even as the driver makes micro-adjustments to the steering.

As described herein, aspects of the present invention may provide steering assistance by providing commands and control instructions to a steering control system that is physically linked to a vehicle's steering system. For example, aspects of the present invention may provide control instructions to counteract micro-adjustments made by the driver such that the steering system physically alters the steering wheel's position, and hence, alters the position of corresponding mechanical links and gears connected to the steer while, thereby altering the position of the vehicle's wheels. As described herein, steering assistance may be provided for micro-adjustments when the steering degree is within a threshold such that steering assistance is not noticeable to the driver, and steering assistance does not interfere when the driver intends to make a turn or change lanes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
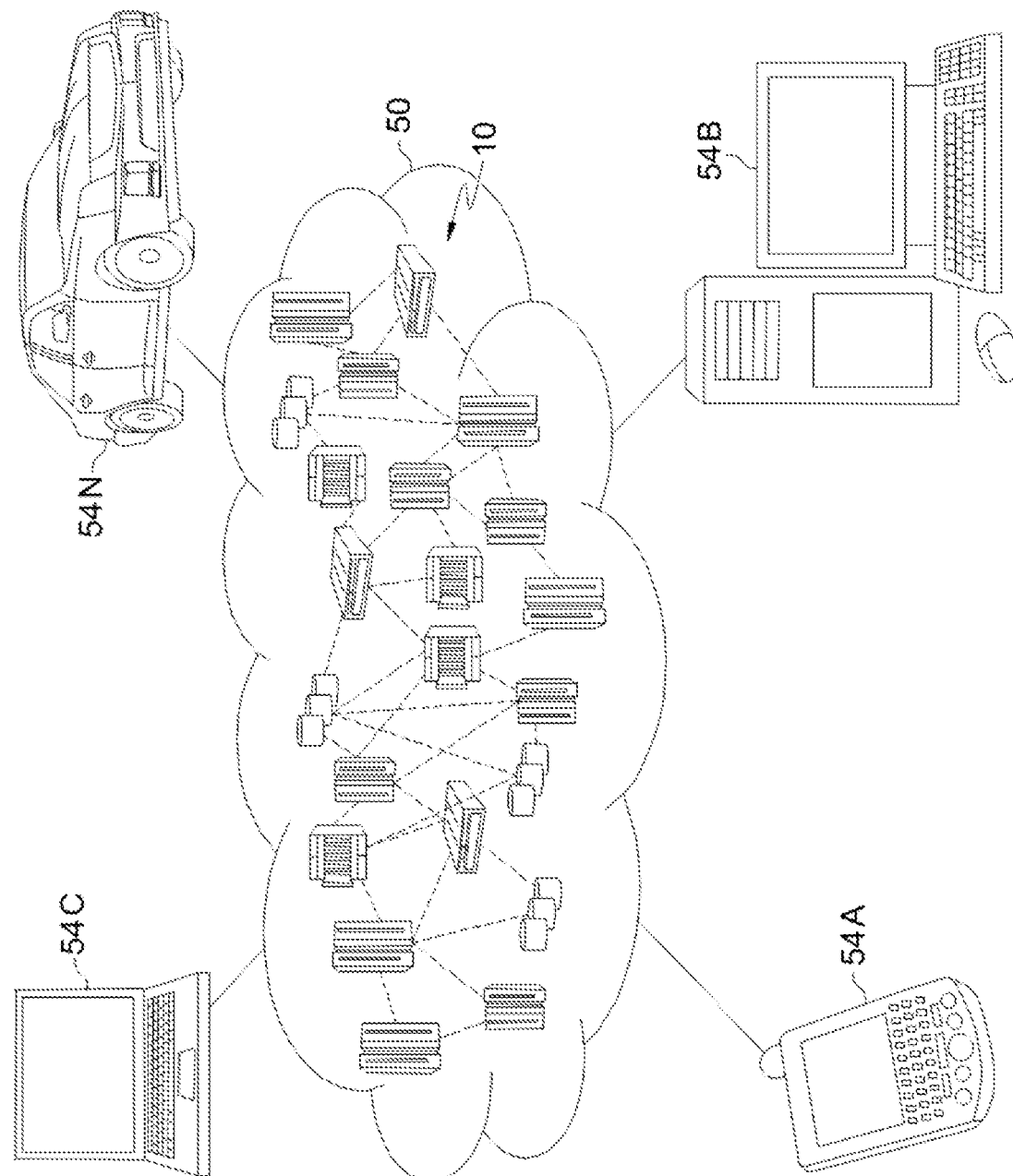
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
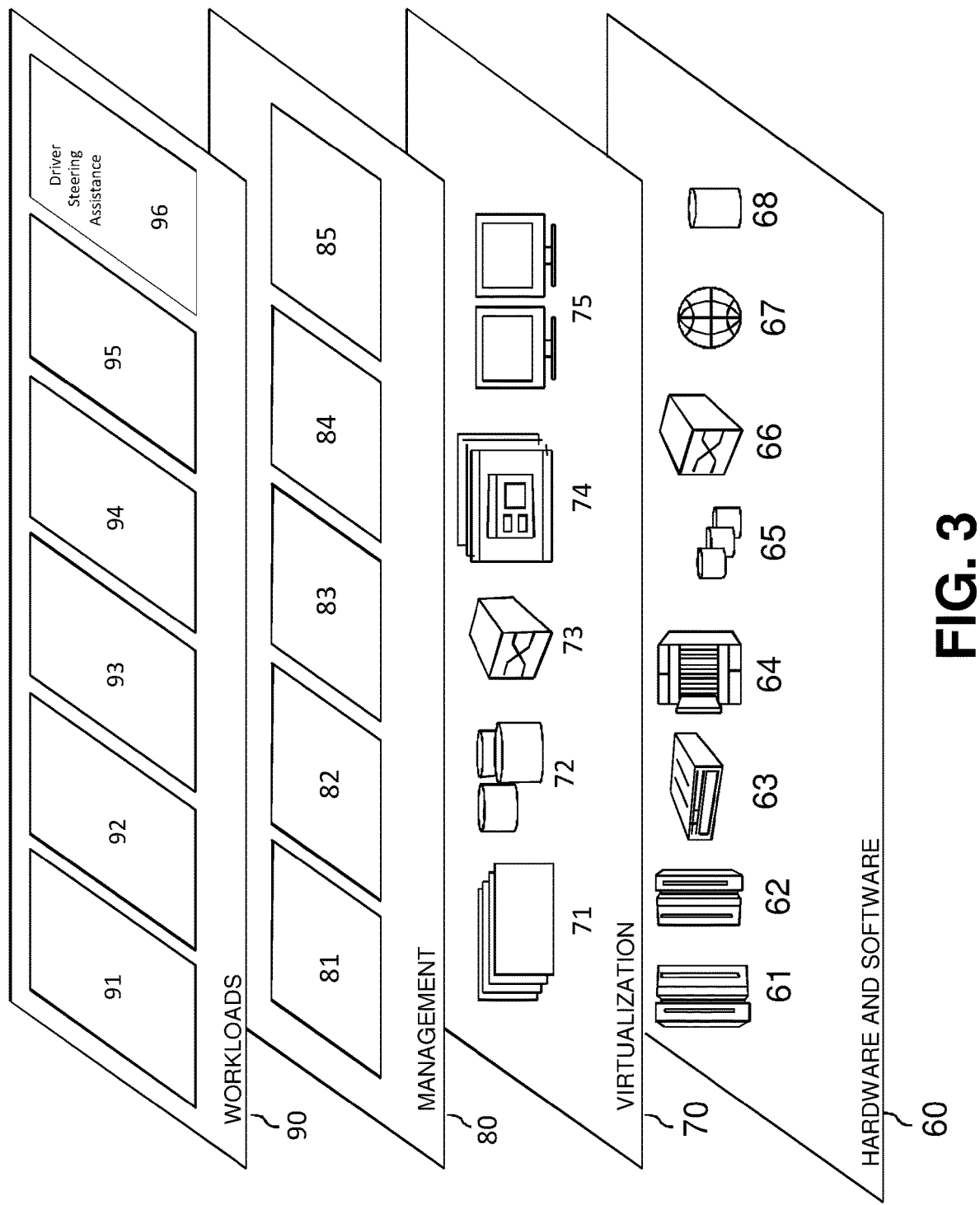
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and driver steering assistance 96.

Referring back to FIG. 1, the program/utility 40 may include one or more program modules 42 that generally carry out the functions and/or methodologies of embodiments of the invention as described herein (e.g., such as the functionality provided by driver steering assistance 96). Specifically, the program modules 42 may generate a driver profile, monitor steering assistance related variables during the operation of a vehicle, determine a driver's intentions based on the monitoring of the variables, determine steering assist control instructions based on the driver's profile and variables to maintain a vehicle within a driving lane, and provide the steering assist control instructions to a steering control system. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a steering assist component 210 shown FIG. 4.

Figure 4:
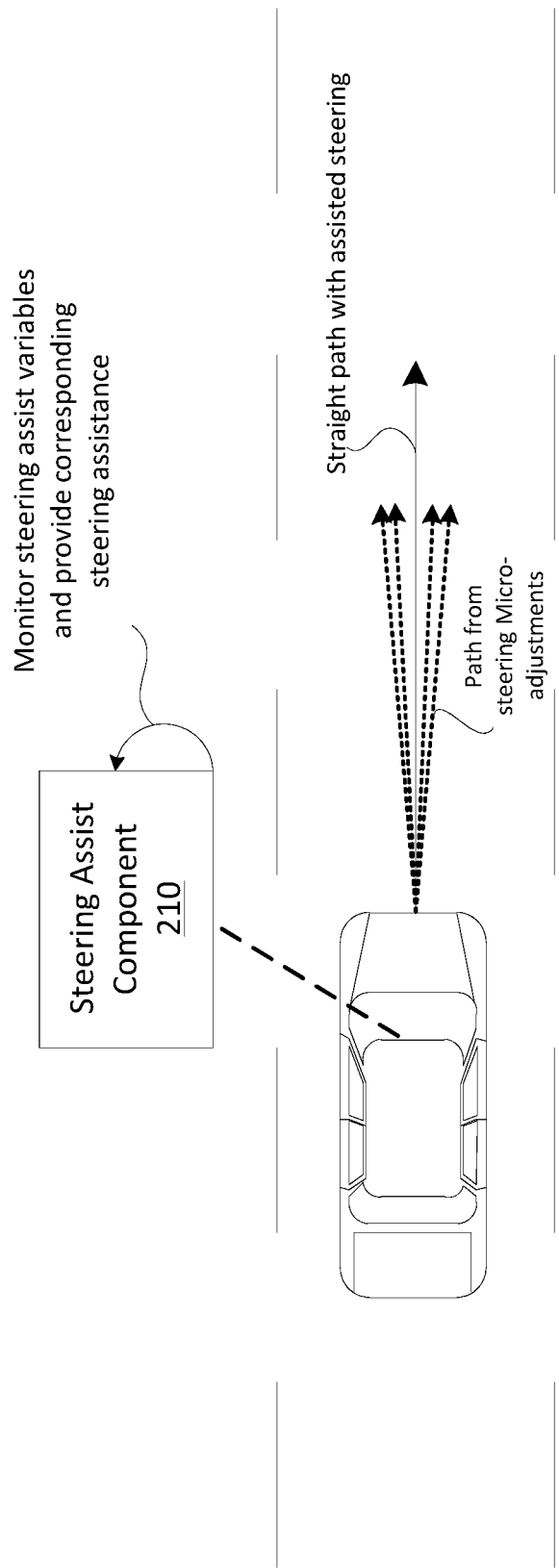
FIG. 4 shows an overview of an example implementation in accordance with aspects of the present invention.

FIG. 4 shows an overview of an example implementation in accordance with aspects of the present invention. As shown in FIG. 4, a steering assist component 210 may be implemented within a vehicle. The vehicle's path from steering micro-adjustments from a driver is shown, and could result in the vehicle veering out of the driving lane or resulting in an unsteady/erratic ride. Accordingly, the steering assist component 210 may monitor steering assist variables and provide corresponding steering assist instructions to a steering control system. As described herein, the steering assist variables may include a driver's profile, degree and frequency of steering adjustments made by the driver, current road conditions, current driving and road conditions, vehicle analytics (e.g., turn signal status, vehicle maintenance and wheel alignment status, navigation directions, vehicle speed, etc.), environmental conditions, the degree of a steer/turn, the presence of surrounding vehicles, distance to surrounding vehicles, time of day, lighting conditions, and/or other factors. Based on monitoring the steering assist variables, the steering assist component 210 may determine the driver's intentions, and provide steering assistance when the driver's intentions are to maintain the vehicle within the driving lane. As shown in FIG. 4, the steering assist component 210 may provide the steering assistance to counteract micro-adjustments made by the driver such that the vehicle's path remains straight and within the driving lane. In embodiments, the steering assist component 210 may provide steering assistance to counteract micro-adjustments such that the vehicle's path remains within a driving lane on a curved driving path.

Figure 5:
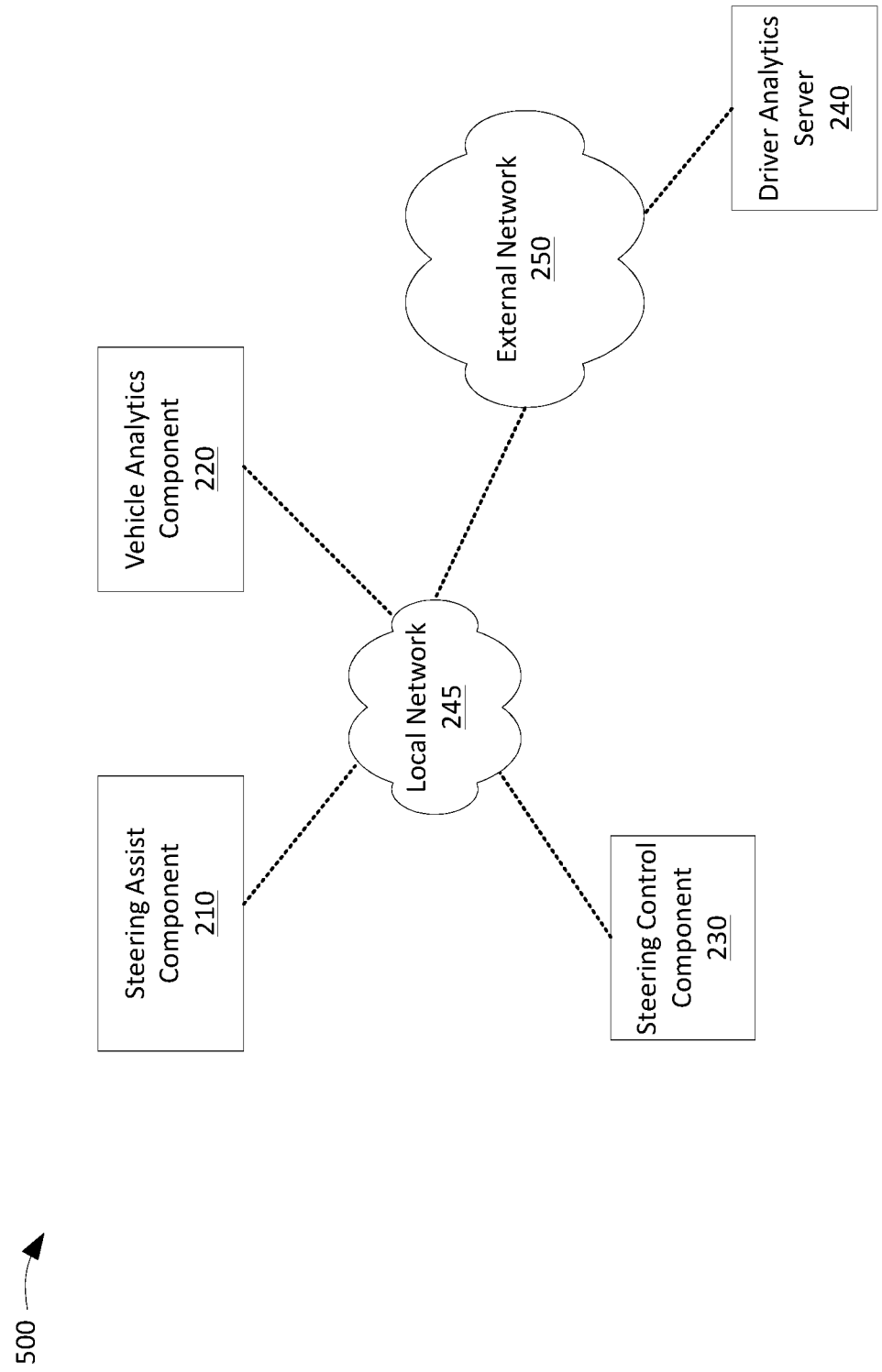
FIG. 5 shows an example environment in accordance with aspects of the present invention.

FIG. 5 shows an example environment in accordance with aspects of the present invention. As shown in FIG. 5, environment 500 may include a steering assist component 210, a vehicle analytics component 220, a steering control component 230, a driver analytics server 240, a local network 245, and an external network 250. In embodiments, one or more components in environment 500 may correspond to one or more components in the cloud computing environment of FIG. 2. In embodiments, one or more components in environment 500 may include the components of computer system/server 12 of FIG. 1.

The steering assist component 210 may include one or more computing devices (e.g., such as computer system/server 12 of FIG. 1) that monitors steering assist variables and provides corresponding steering assist instructions to a steering control system. In embodiments, the steering assist component 210 may track driver micro-adjustment behavior (e.g., degree/frequency of driver micro-adjustments made to keep a vehicle within a driving lane), and associate the driver micro-adjustment behavior with driving conditions (e.g., vehicle type, road conditions, weather conditions, vehicle speed, etc.). Aspects of the present invention may provide the driver micro-adjustment behavior and associated conditions to the driver analytics server 240 which may generate a driver profile. As described herein the driver profile may be used, along with real-time steering assist variables, to determine steering assist instructions for counteracting micro-adjustments made by the driver. The steering assist component 210 may provide the steering assist instructions to the steering control component 230.

The vehicle analytics component 220 may include one or more computing devices (e.g., such as computer system/server 12 of FIG. 1) that track vehicle analytics information including a subset of the steering assist variables. For example, the vehicle analytics component 220 may track vehicle speed, direction, navigation direction, vehicle maintenance status, vehicle accelerometer data, vehicle wheel-alignment status, steering wheel turning data (e.g., degree of steering based on accelerometer devices within the steering wheel), or the like. Information from the vehicle analytics component 220 may be used by the steering assist component 210 to generate steering assist instructions.

The steering control component 230 may include one or more computing devices (e.g., such as computer system/server 12 of FIG. 1) that receives steering assist instructions from the steering assist component 210. In embodiments, the steering control component 230 may execute the instructions by engaging electro-mechanical steering components to physically adjust the steering wheel and, in turn, adjust the trajectory of the vehicle (e.g., to keep the vehicle in a path that is within a driving lane). Additional details regarding the operations of the steering control component 230 are described below with respect to FIG. 7.

The driver analytics server 240 may include one or more computing devices (e.g., such as computer system/server 12 of FIG. 1) that receives driver analytics information from the steering assist component 210, and builds, maintains, and updates a driver profile over a period of time. For example, the driver analytics server 240 may receive driver micro-adjustment behavior (e.g., degree/frequency of driver micro-adjustments made to keep a vehicle within a driving lane), the conditions under which the driver made the micro-adjustments (e.g., vehicle type, road conditions, weather conditions, vehicle speed, etc.). The driver analytics server 240 may generate a driver profile in a structured manner such that it may be accessed at a later time for generating driver assist instructions by the steering assist component 210.

The local network 245 may include a local area network (LAN), wireless LAN (WLAN), personal area network (PAN), near-field communications (NFC) network, or the like. Additionally, or alternatively, the local network 245 may include a combination of wireless and wired connection, such as a connection via a universal serial bus (USB) cable, a serial cable, an Ethernet cable, or the like. In embodiments, the local network may also communicate with the external network 250. In embodiments, the steering assist component 210, the vehicle analytics component 220, and the steering control component 230 may communicate via the local network 245 within a vehicle.

The external network 250 may include network nodes, such as network nodes 10 of FIG. 2. Additionally, or alternatively, the external network 250 may include one or more wired and/or wireless networks. For example, the external network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the external network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
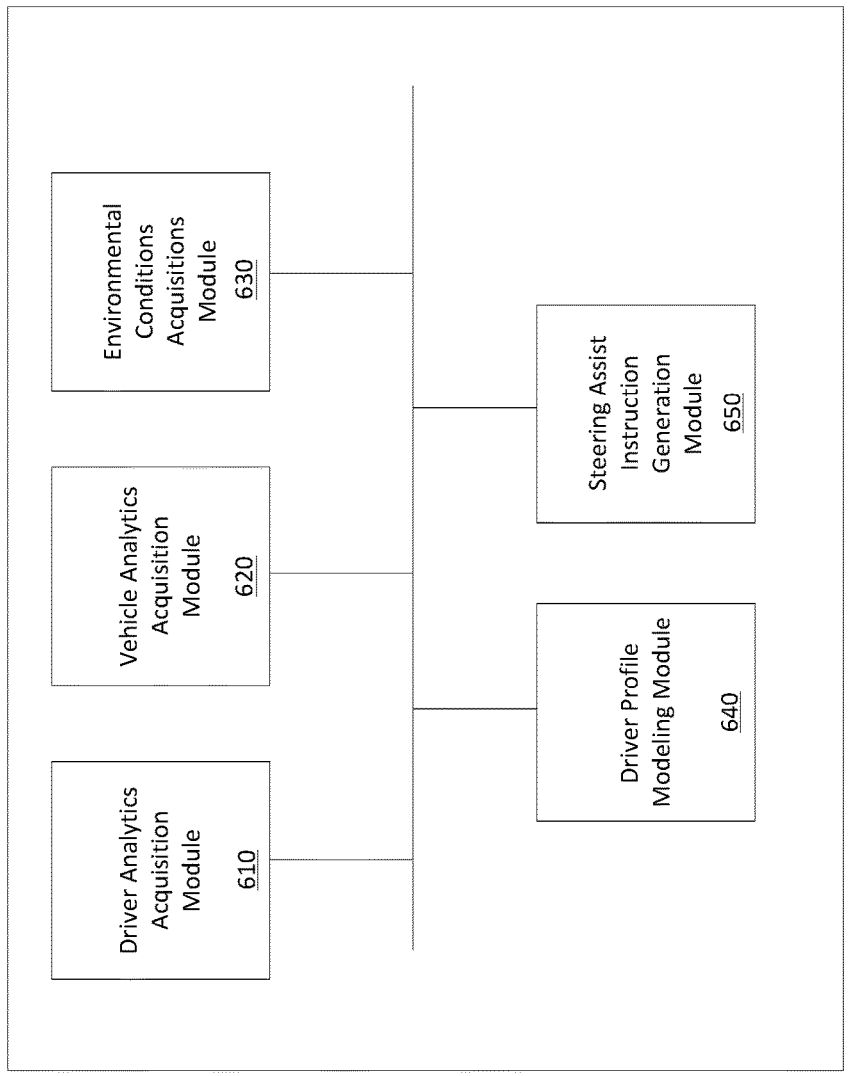
FIG. 6 shows a block diagram of example components of a steering assist component in accordance with aspects of the present invention.
Figure 6:

FIG. 6 shows a block diagram of example components of a steering assist component in accordance with aspects of the present invention. As shown in FIG. 6, the steering assist component 210 may include a driver analytics acquisition module 610, a vehicle analytics acquisition module 620, an environmental conditions acquisition module 630, a driver profile modeling module 640, and a steering assist instruction generation module 650. In embodiments, the steering assist component 210 may include additional or fewer components than those shown in FIG. 6. In embodiments, separate components may be integrated into a single computing component or module. Additionally, or alternatively, a single component may be implemented as multiple computing components or modules.

The driver analytics acquisition module 610 may include a program module (e.g., program module 42 of FIG. 1) that acquires driver analytics information as a vehicle is being driven by a driver. For example, the driver analytics acquisition module 610 may obtain driver analytics information including driver identification information, vehicle information, and driver micro-adjustment behavior, such as degree/frequency of driver micro-adjustments made to keep a vehicle within a driving lane. In embodiments, the driver analytics acquisition module 610 may obtain driver analytics information from the vehicle analytics component 220 which may provide steering wheel adjustment behavior based on one more accelerometer devices within the steering system.

In embodiments, the driver analytics acquisition module 610 may receive driver identification information based on the presence of a driver's user device within the vehicle (e.g., the driver's smartphone, tablet, wearable computing device, etc.) and/or detecting the use/presence of a key fob assigned to the driver. Additionally, or alternatively, the driver analytics acquisition module 610 may identify the driver using onboard cameras installed within a vehicle and using facial recognition techniques. Additionally, or alternatively, the driver analytics acquisition module 610 may identify the driver by using biometrics data obtained using biometrics acquisition devices implemented within the vehicle. Additionally, or alternatively, the driver analytics acquisition module 610 may identify the driver based on login information received via user input identifying the driver.

As described herein, the driver identification information may be used to generate a profile for the driver such that the driver profile can be later used to generate custom steering assist instructions best suited for the driver based on the driver's historical micro-adjustment steering, the trajectory of the vehicle based on the micro-adjustments, and the conditions under which those micro-adjustments were made. For example, the driver profile may identify different sets of conditions, and different effects/vehicle trajectories of micro-adjustments under the different sets of conditions. In this way, steering assist instructions to counteract micro-adjustments may be different based on different driving conditions.

The vehicle analytics acquisition module 620 may include a program module (e.g., program module 42 of FIG. 1) that obtains vehicle analytics information while the vehicle is being driven. For example, the vehicle analytics acquisition module 620 may obtain (e.g., from the vehicle analytics component 220) information identifying the vehicle type, vehicle make/model, vehicle speed, vehicle turn signal status, etc. Additionally, or alternatively, the vehicle analytics acquisition module 620 may obtain vehicle navigation direction, vehicle maintenance status, vehicle accelerometer data, vehicle wheel-alignment status, or the like.

The environmental conditions acquisitions module 630 may include a program module (e.g., program module 42 of FIG. 1) that obtains environmental condition information while the vehicle is being driven. For example, the environmental conditions acquisitions module 630 may obtain information identifying the time of day, lighting conditions, weather information, road conditions, etc. (e.g., using lighting sensors, obtaining weather data from external whether data reporting web servers, obtaining road conditions from web servers that store and report road conditions information, etc.).

The driver profile modeling module 640 may include a program module (e.g., program module 42 of FIG. 1) that provides driver profile modeling information the driver analytics server 240 for generating a driver profile. For example, the driver profile modeling module 640 may provide the driver analytics and micro-adjust behavior information (obtained by the driver analytics acquisition module 610), and conditions associated with the driver analytics and micro-adjust behavior (e.g., information obtained by the vehicle analytics acquisition module 620 and the environmental conditions acquisitions module 630) to the driver analytics server 240. In embodiments, the driver profile modeling module 640 may store, in a data structure, information identifying the driver analytics with the driving conditions. For example, the data structure may identify the degree and frequency of micro-adjustments made by the driver, and the conditions under which the micro-adjustments were made (e.g., whether the micro-adjustments were made during the day, at night, the conditions of the road, weather conditions, vehicle speed, type of vehicle, etc.).

The steering assist instruction generation module 650 may include a program module (e.g., program module 42 of FIG. 1) that generates steering assist instructions in real-time based on real-time steering assist variables obtained by the driver analytics acquisition module 610, vehicle analytics acquisition module 620, and environmental conditions acquisitions module 630, and further based on driver profile information. As described herein, the steering assist instruction generation module 650 may determine an intention of the driver based on the steering degree, turn signal status, navigation directions, vehicle presence in adjacent lanes, etc. When the steering assist instruction generation module 650 determines that the intention of the driver is to maintain vehicle position within a driving lane, the steering assist instruction generation module 650 may generate steering assist instructions to counteract over adjustments made by the driver that may otherwise cause the vehicle to veer out of an optimal position (e.g., a center of a driving lane).

In embodiments, the steering assist instructions may be based on the driver's profile and current vehicle and driving conditions. For example, the steering assist may be greater at night and in inclement weather when the driver's profile indicates that the driver's micro-adjustments are greater during night time and inclement weather. Similarly, the steering assist maybe greater or different when the vehicle's wheel alignment has not been serviced within a certain period of time, and hence, would require more adjustments to keep the vehicle straight within a driving lane. In a similar vein, the steering assist may vary based on the driver's habits, accident history information, or other driver information, environmental conditions information, and/or vehicle analytics information.

Figure 7:
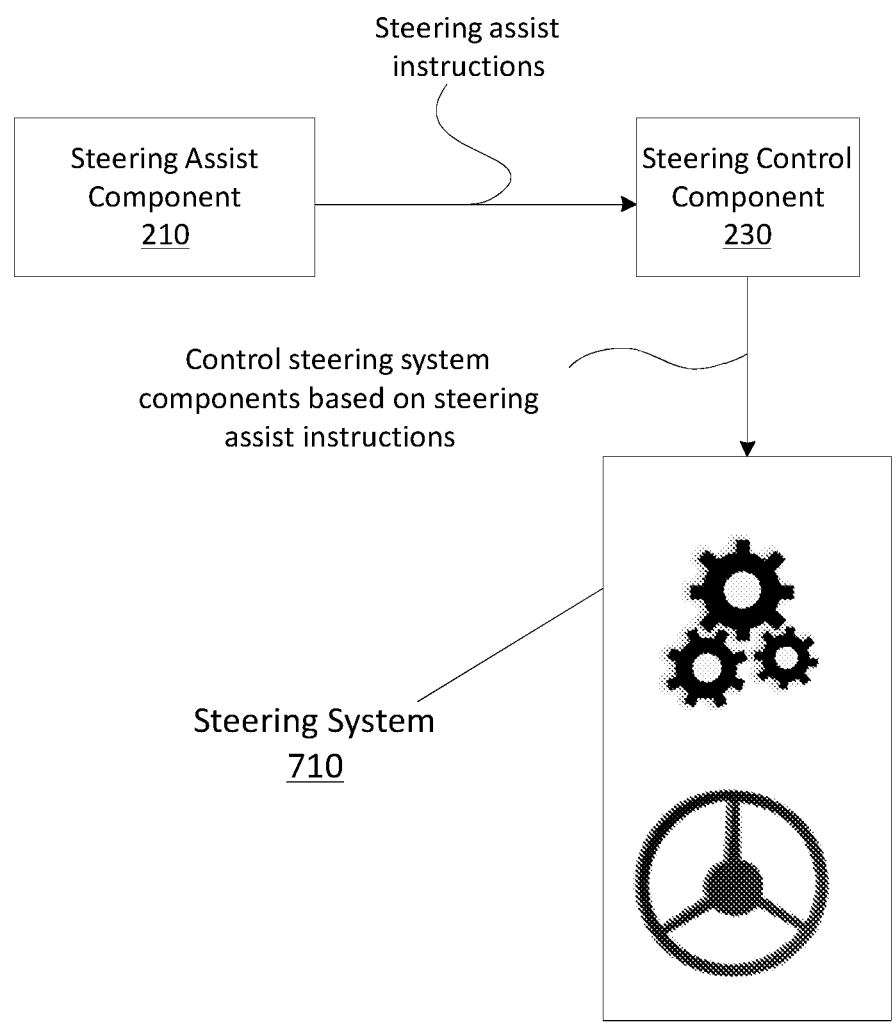
FIG. 7 shows an example implementation of implementing steering assist instructions in accordance with aspects of the present invention.

FIG. 7 shows an example implementation of implementing steering assist instructions in accordance with aspects of the present invention. As shown in FIG. 7, the steering assist component 210 may provide steering assist instructions to the steering control component 230. Based on receiving the steering assist instructions, the steering control component 230 may control a steering system 710 based on the steering assist instructions. For example, the steering control component 230 may include control devices to drive gears, linkages, a steering rack, and/or a steering wheel to alter the trajectory of a vehicle in accordance with the steering assist instructions. In this way, the steering assist component 210 may assist a driver in keeping a vehicle within a driving lane by counteracting micro-adjustments in the driver's steering that would cause the vehicle to veer outside of an optimal position, such as the center of a driving lane.

Figure 8:
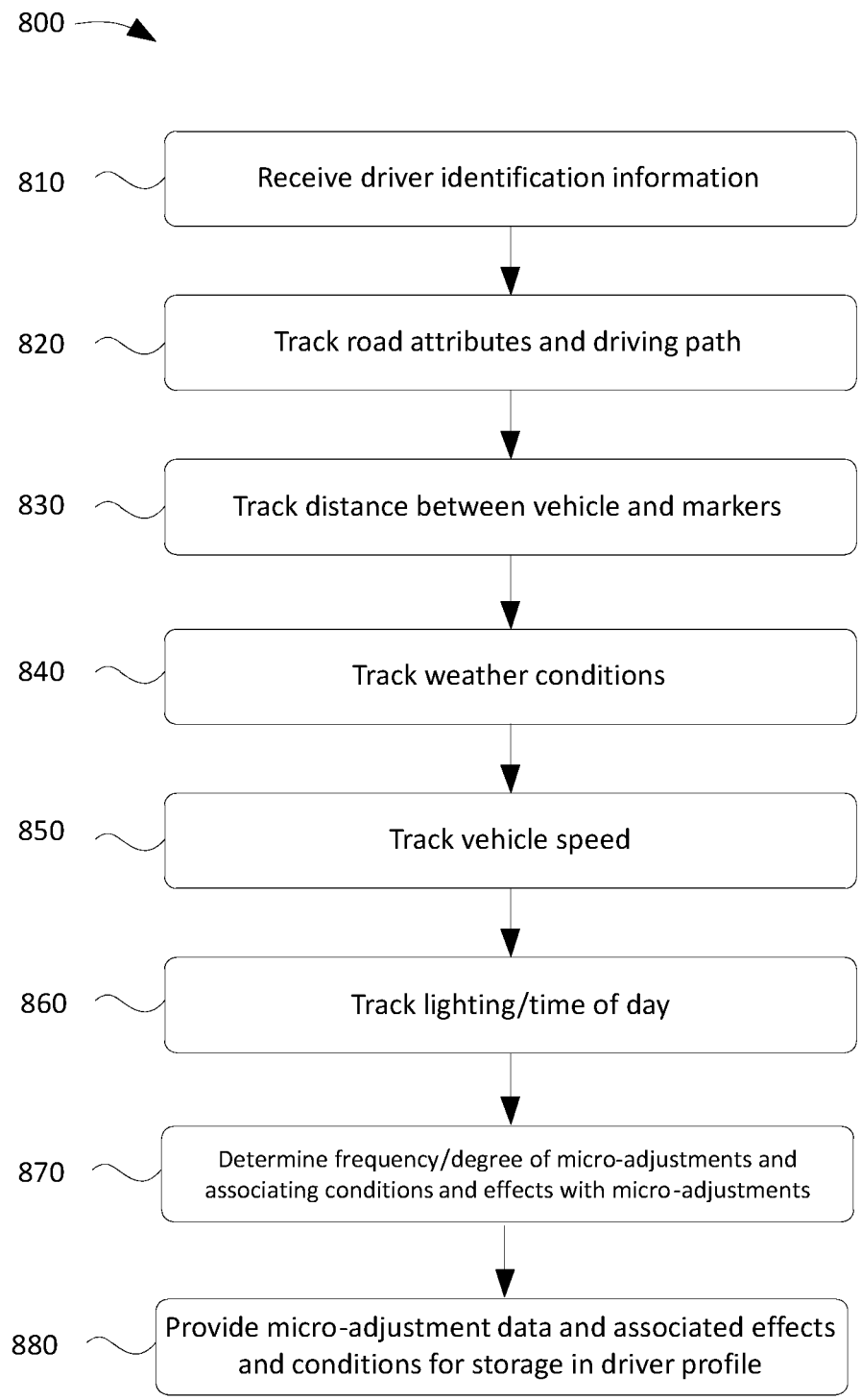
FIG. 8 shows an example flowchart of a process for generating and updating a driver profile to be used for providing steering assistance in accordance with aspects of the present invention.

FIG. 8 shows an example flowchart of a process for generating and updating a driver profile to be used for providing steering assistance. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include receiving driver identification information (step 810). For example, as described above with respect to the driver analytics acquisition module 610, the steering assist component 210 may receive driver identification information (e.g., based on detecting the presence of a user device and/or key fob assigned to the driver, onboard cameras and facial recognition, biometrics data, user input identifying the driver, etc.).

Process 800 may also include tracking road attributes and driving path (step 820). For example, as described above with respect to the driver analytics acquisition module 610 and the environmental conditions acquisitions module 630, the steering assist component 210 may track (e.g., monitor or receive data at periodic intervals) a driving path of the vehicle based on the micro-adjustments made by the driver. Additionally, or alternatively, the steering assist component 210 may track the road conditions based on vehicle analytics data, accelerometer data, wheel alignment data, or the like that indicates the conditions of a road (e.g., whether the road is relatively flat, worn out/concave, etc.).

Process 800 may further include tracking a distance between the vehicle and road markers (step 830). For example, as described above with respect to the driver analytics acquisition module 610, the steering assist component 210 may track the distance between the vehicle and road markers (e.g., driving lane lines) to identify the relative position between the vehicle and the road markers after micro-adjustments are made by the driver.

Process 800 may also include tracking weather conditions (step 840). For example, as described above with respect to the environmental conditions acquisitions module 630, the steering assist component 210 may track weather conditions (e.g., temperature, precipitation, etc.). Process 800 may further include tracking vehicle speed (step 850). For example, as described above with respect to the driver analytics acquisition module 610, the steering assist component 210 may track the speed of the vehicle. Process 800 may also include tracking the lighting/time of day (step 860). For example, as described above with respect to the environmental conditions acquisitions module 630, the steering assist component 210 may track the lighting/time of day.

Process 800 may further include determining the frequency/degree of micro-adjustments and associating conditions and effects with the micro-adjustments (step 880). For example, as described above with respect to the driver analytics acquisition module 610 and the driver profile modeling module 640, the steering assist component 210 may determine the frequency and degree of the micro adjustments. The steering assist component 210 may associate the effects of the micro-adjustments (e.g., the path of the vehicle, and the distance between the vehicle and the markers, and the micro-adjustments were excessive to the point of causing an unsteady or erratic ride or veering into an adjacent lane) with the conditions under which the micro-adjustments were made (e.g., conditions such as the road conditions, weather conditions, vehicle speed, time of day, etc.). As described herein, the steering assist component 210 may continue to add or update different sets of conditions with different effects of micro-adjustments made by the driver such that steering assist instructions are based on the effects of micro-adjustments for a given set of conditions.

Process 800 may also include providing the micro-adjustment data and associated effects and conditions for storage in a driver profile (step 880). For example, as described above with respect to the driver profile modeling module 640, the steering assist component 210 may provide (e.g., to the driver analytics server 240), the micro-adjustment data and associated effects and conditions for storage in a driver profile. As described herein, the driver profile may identify the driver and identify different micro-adjustments made, the effects of those micro-adjustments (e.g., whether the micro-adjustments were excessive to the point of causing an unsteady or erratic ride or veering into an adjacent lane), and the conditions under which the micro-adjustments were made. The driver profile may be used to identify steering assist instructions to counteract micro-adjustments.

Figure 9:
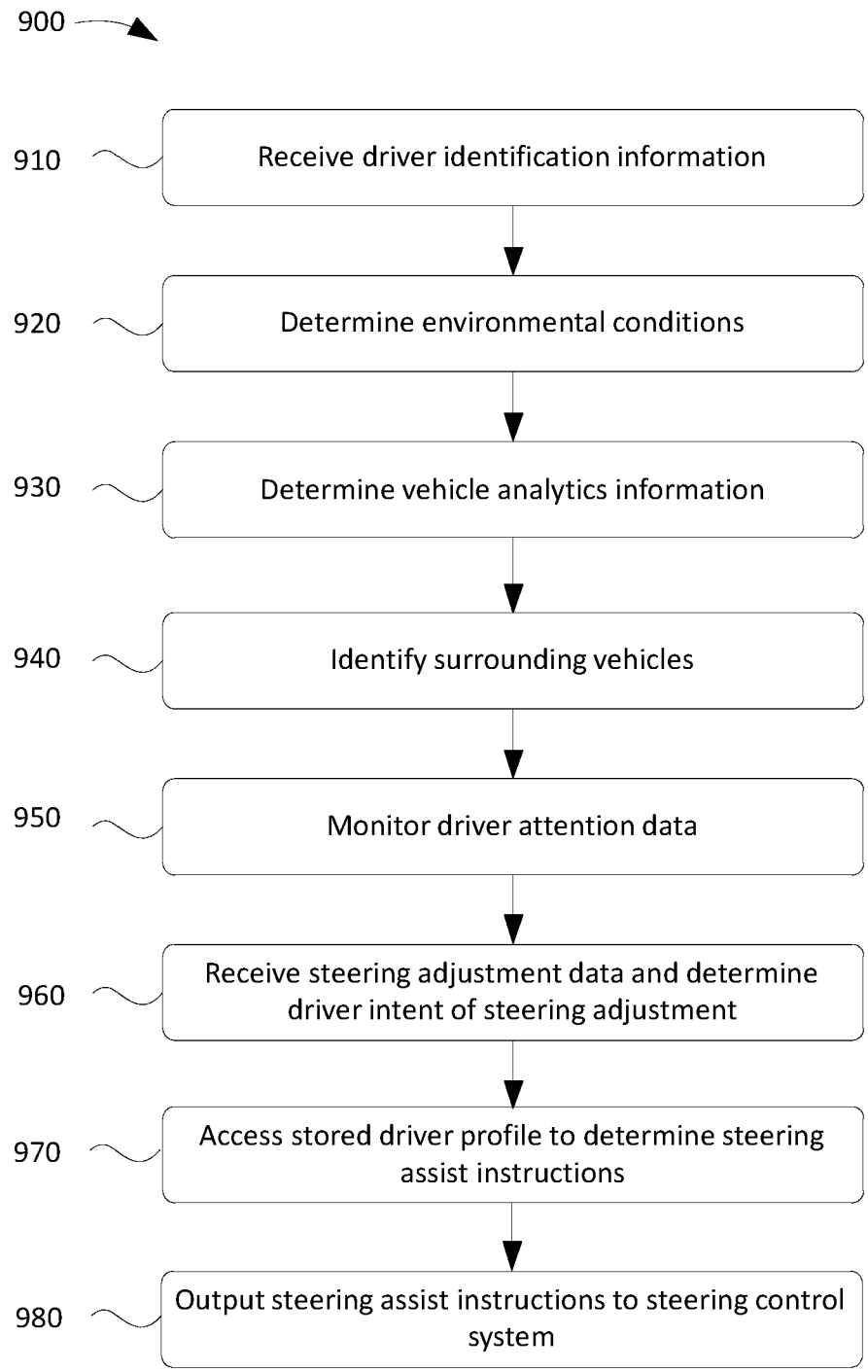
FIG. 9 shows an example flowchart of a process for generating and outputting steering assistance instructions in real-time based on an established driver profile in accordance with aspects of the present invention.

FIG. 9 shows an example flowchart of a process for generating and outputting steering assistance instructions in real-time based on an established driver profile. The steps of FIG. 9 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 9, process 900 includes receiving driver identification information (step 910). For example, as described above with respect to the driver analytics acquisition module 610, the steering assist component 210 may receive driver identification information based on the presence of a driver's user device within the vehicle (e.g., the driver's smartphone, tablet, wearable computing device, etc.), detecting the use/presence of a key fob assigned to the driver, onboard cameras installed, and using facial recognition techniques, biometrics data obtained using biometrics acquisition devices, and/or based on login information received via user input identifying the driver. The steering assist component 210 may receive the driver identification information when the driver enters the vehicle and/or starts the vehicle to begin driving.

Process 900 may further include determining environmental conditions (step 920). For example, as described above with respect to the environmental conditions acquisitions module 630, the steering assist component 210 may determine and monitor the environmental conditions (e.g. the time of day, lighting conditions, weather information, road conditions, etc.).

Process 900 may also include determining vehicle analytics information (step 930). For example, as described above with respect to the vehicle analytics acquisition module 620, the steering assist component 210 may determine and monitor the vehicle analytics information (e.g., identifying the vehicle type, vehicle make/model, vehicle speed, vehicle navigation directions including vehicle driving path, vehicle turn signal status, vehicle maintenance status, vehicle accelerometer data, vehicle wheel-alignment status, etc.).

Process 900 may further include identifying surrounding vehicles (step 940). For example, the steering assist component 210 may identify whether surrounding vehicles are present using external cameras, object detection sensors, or the like. Additionally, or alternatively, the steering assist component 210 may identify the presence of surrounding vehicles based on some other technique (e.g., the presence of network communications signals emitted by surrounding vehicle communications systems).

Process 900 may also include monitoring driver attention data (step 950). For example, the steering assist component 210 may use onboard cameras and/or other attention detection devices to detect the attention of the driver. As an example, the steering assist component 210 may determine a viewing direction of the driver to determine whether the driver is focusing on the road. Additionally, or alternatively, the vehicle analytics component 220 may determine driver attention based on whether the driver is interacting with onboard devices, such as navigation systems, radio, etc.

Process 900 may further include receiving steering adjustment data and determining the driver's intent of a steering adjustment (step 960). For example, the steering assist component 210 may receive steering adjustment data (e.g., from the vehicle analytics acquisition module 620) identifying the frequency and degree of steering adjustments made by a driver in real-time. The steering assist component 210 may determine whether a driver's steering adjustments were intended to keep the vehicle within the driving lane (e.g., micro-adjustments), or if the steering adjustment was intended to change lanes or make a turn. As described herein, the steering assist component 210 may determine an intention of the driver based on the steering degree, turn signal status, navigation directions, vehicle presence in adjacent lanes, etc. For example, the steering assist component 210 may determine whether a driver is intending to change lanes or stay within the same driving lane based on a turn signal being active or inactive, whether the degree of the turn exceeds a threshold, whether vehicles are present in an adjacent lane, and/or whether navigation directions indicate that the driver will need to change lanes or make a turn.

Process 900 may also include accessing a stored driver profile to determine steering assistance instructions (step 970). For example, as described above with respect to the steering assist instruction generation module 650, the steering assist component 210 may access the stored driver profile to determine the steering instructions based on determining that the driver intends to stay within the same driving lane. In embodiments, the steering assist component 210 may identify the current, real-time conditions (e.g., as determined at steps 910-950), and compare the real-time conditions to the conditions stored in the driver profile. The steering assist component 210 may identify which set of conditions in the driver profile corresponding to the real-time conditions, identify the effects/vehicle trajectory for the historical micro-adjustments made under the same real-time conditions, and generate steering assist instructions that counteract micro-adjustments that would cause the vehicle to veer out of the driving lane. As an example, the steering assist instructions may direct the vehicle's steering system to counteract a micro-adjustment by 2% of a driver's original steering adjustment during the daytime, when the driver's attention is focused on the road, when the road's conditions and vehicle wheel alignment is relatively flat, and when the weather is dry. As another example, the steering assist instructions may direct the vehicle's steering system to counteract a micro-adjustment by 4% of a driver's original steering adjustment during the nighttime, when the driver's attention is not entirely focused on the road, and when the weather is raining.

In embodiments, the steering assist component 210 may determine the steering assist instructions based on a predicted trajectory of the vehicle from a driver's micro-adjustments. For example, the steering assist component 210 may determine, based on real time steering data, that the vehicle is likely to veer out of an optimal position (e.g., directly in the center of a driving lane), and that the driver is unlikely to correct the steering to return the vehicle to the optimal position based on the driver's historical driving habits identified in the driver's profile, and/or based on the driver's attention. In embodiments, the steering assist component 210 may generate steering instructions to counteract the projected trajectory and maintain the vehicle in an optimal position.

Process 900 may further include outputting steering assist instructions to the steering control component (step 980). For example, the steering assist component 210 may output the steering assist instructions to the steering control component 230 of the vehicle. As described herein, the steering control component 230 may control a steering system 710 based on the steering assist instructions. In this way, the steering assist component 210 may assist a driver in keeping a vehicle within a driving lane by counteracting micro-adjustments in the driver's steering that would cause the vehicle to veer outside of the driving lane. In embodiments, the steering assist component 210 may refrain from making any steering adjustments when the intent of the driver is to change lanes or make a turn. In embodiments, the steering assist component 210 may update the driver profile based on the effects of the steering assist instructions. For example, if the steering assist instructions over-correct a micro-adjustment, the steering assist component 210 may update the driver profile to note the over-correction such that the steering assist component 210 may modify future steering assist instructions so as to prevent over-corrections to steering.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, data identifying steering adjustments made by a driver of a vehicle;
determining, by the computing device, whether the driver is intending to change lanes or stay within a current driving lane based on a turn signal being active or inactive, and based on whether a degree of a turn of the vehicle indicated by the steering adjustments exceeds a threshold;
monitoring, by the computing device, steering assist variables which include a driver's profile, a frequency and degree of steering adjustments made by the driver, current road conditions, current driving conditions, vehicle analytics including vehicle maintenance and wheel alignment status, navigation directions, vehicle speed, environmental conditions, a presence of surrounding vehicles, a distance to surrounding vehicles, a time of day, and lighting conditions;
tracking, by the computing device, a distance between the vehicle and road markers after the steering adjustments are made by the driver;
identifying, by the computing device, a relative position between the vehicle and the road markers from the tracked distance;
monitoring, by the computing device, driver attention data using onboard cameras detecting an attention of the driver;
generating, by the computing device, steering assist instructions based on determining that the driver intends to maintain the vehicle's position within the current driving lane, the relative position between the vehicle and the road markers, the monitored steering assist variables and the attention of the driver; and
outputting, by the computing device, the steering assist instructions to counteract the steering adjustments made by the driver and maintain the vehicle's position within the current driving lane.

2. The method of claim 1, wherein the determining whether the driver is intending to change lanes or stay within the current driving lane is further based on whether another vehicle is present in an adjacent lane to the vehicle and determining whether the navigation directions in a navigation system of the vehicle indicate that the driver will need to perform one selected from a group consisting of: changing lanes; and making a turn.

3. The method of claim 1, wherein the outputting the steering assist instructions causes a steering system to drive one or more physical steering components of the vehicle to alter the trajectory of the vehicle.

4. The method of claim 1, further comprising updating the driver profile based on effects of the steering assist instructions.

5. The method of claim 1, further comprising updating the driving profile to identify different effects of micro-adjustments made by the driver for different sets of conditions.

6. The method of claim 1, further comprising refraining from generating the steering assist instructions based on determining that the driver's intent for the steering adjustment is to change lanes or make a turn.

7. The method of claim 1, wherein a service provider at least one of creates, maintains, deploys and supports the computing device.

8. The method of claim 1, wherein the receiving the data identifying the steering adjustments the determining the intent of the driver, the generating the steering assist instructions, and the outputting the steering assist instructions are provided by a service provider on a subscription, advertising, and/or fee basis.

9. The method of claim 1, wherein the computing device includes software provided as a service in a cloud environment.

10. The method of claim 1, further comprising deploying a system for providing steering assistance for the vehicle, comprising providing a computer infrastructure operable to perform the receiving the data identifying the steering adjustments the determining the intent of the driver, the generating the steering assist instructions, and the outputting the steering assist instructions.

11. The method of claim 1, further comprising receiving driver identification information based on presence of a driver's user device within the vehicle.

12. The method of claim 11, further comprising receiving the driver identification information when the driver enters the vehicle.

13. The method of claim 11, further comprising receiving the driver identification information when the driver starts the vehicle.

14. The method of claim 1, further comprising determining environmental conditions including time of day, lighting conditions, weather information and road conditions.

15. The method of claim 1, further comprising determining the vehicle analytics information including vehicle type, the vehicle speed, vehicle navigational the navigation directions, vehicle turn signal status, and the vehicle maintenance status.

16. The method of claim 1, further comprising determining whether surrounding vehicles are present adjacent the vehicle using external cameras and object detection sensors.

17. The method of claim 1, further comprising:
receiving driver identification information based on a presence of a driver's user device within the vehicle, detection of a presence of a key fob assigned to the driver, the onboard cameras installed in the vehicle, facial recognition techniques and biometric data of the driver obtained using biometric acquisition devices;
determining driver focus of the driver using the onboard cameras detecting the driver is focusing on the road;
further determining the driver attention data based on whether the driver is interacting with a navigation system and a radio using the onboard cameras;
determining environmental conditions including time of day, lighting conditions, weather information and road conditions;
determining vehicle analytics information including vehicle type, vehicle speed, vehicle navigational directions, vehicle turn signal status, vehicle maintenance status, vehicle accelerometer data, and vehicle wheel alignment status; and
determining whether surrounding vehicles are present adjacent the vehicle using external cameras and object detection sensors,
wherein the receiving of the driver identification information occurs during at least one of a time selected from a group consisting of: when the driver enters the vehicle; and when the driver starts the vehicle.

* * * * *